(12) United States Patent
Hsu et al.

(10) Patent No.: US 7,811,485 B2
(45) Date of Patent: Oct. 12, 2010

(54) OPTICAL PLATE HAVING THREE LAYERS AND METHOD FOR MANUFACTURING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 111 days.

(21) Appl. No.: 11/778,079

(22) Filed: Jul. 16, 2007

(65) Prior Publication Data

US 2008/0130118 A1    Jun. 5, 2008

(30) Foreign Application Priority Data

Dec. 1, 2006    (CN) .......................... 2006 1 0201185

(51) Int. Cl.
*B29D 11/00* (2006.01)
(52) U.S. Cl. ................. 264/1.7; 264/1.1; 264/1.24; 264/1.32; 264/2.1; 264/1.34; 264/2.2; 264/2.7; 264/250; 264/255; 264/259; 264/328.7; 264/328.8

(58) Field of Classification Search .............. 264/1.7, 264/1.1, 1.24, 1.32, 2.1, 1.34, 2.2, 2.7, 250, 264/255, 259, 328.7, 328.8
See application file for complete search history.

(56) References Cited

U.S. PATENT DOCUMENTS

| | | | |
|---|---|---|---|
| 6,104,854 A | | 8/2000 | Masaki et al. |
| 6,107,563 A | * | 8/2000 | Nakanishi et al. ............ 136/256 |
| 6,790,027 B1 | * | 9/2004 | Callen et al. ................. 425/556 |
| 6,827,456 B2 | | 12/2004 | Parker et al. |
| 7,156,547 B2 | * | 1/2007 | Toshima et al. ............. 362/618 |
| 2005/0146872 A1 | | 7/2005 | Chang et al. |
| 2007/0014034 A1 | * | 1/2007 | Lee et al. ..................... 359/707 |
| 2007/0194494 A1 | * | 8/2007 | Hartlmeier ................ 264/297.3 |

* cited by examiner

*Primary Examiner*—Jeffrey Wollschlager
*Assistant Examiner*—Stella Yi
(74) *Attorney, Agent, or Firm*—Frank R. Niranjan

(57) ABSTRACT

An exemplary optical plate includes a first transparent layer, a second transparent layer and a light diffusion layer. The light diffusion layer is between the first and second transparent layers. The light diffusion layer, the first and second transparent layers are integrally formed. The light diffusion layer includes a transparent matrix resin and a plurality of diffusion particles dispersed in the transparent matrix resin. Both the first and second transparent layers define a plurality of spherical protrusions on an outer surface thereof distalmost from the light diffusion layer respectively. A method for making the optical plate is also provided. In addition, a direct type backlight module using the optical plate is also provided.

3 Claims, 11 Drawing Sheets

OPTICAL PLATE HAVING THREE LAYERS AND METHOD FOR MANUFACTURING THE SAME

CROSS-REFERENCE TO RELATED APPLICATIONS

This application is related to twenty-one co-pending U.S. patent applications, application Ser. No. 11/620,951 filed on Jan. 8, 2007, entitled "OPTICAL PLATE HAVING THREE LAYERS", application Ser. No. 11/620,958, filed on Jan. 8, 2007, entitled "OPTICAL PLATE HAVING THREE LAYERS AND MICRO PROTRUSIONS", application Ser. No. 11/623,302, filed on Jan. 15, 2007, entitled "OPTICAL PLATE HAVING THREE LAYERS", application Ser. No. 11/623,303, filed on Jan. 15, 2007, entitled "OPTICAL PLATE HAVING THREE LAYERS AND BACKLIGHT MODULE WITH SAME", application Ser. No. 11/627,579, filed on Jan. 26, 2007, entitled "OPTICAL PLATE HAVING THREE LAYERS", application Ser. No. 11/671,651, filed on Feb. 6, 2007, entitled "OPTICAL PLATE HAVING THREE LAYERS AND BACKLIGHT MODULE WITH SAME", application Ser. No. 11/672,359, filed on Feb. 7, 2007, entitled "OPTICAL PLATE HAVING THREE LAYERS AND BACKLIGHT MODULE WITH SAME", application Ser. No. 11/716,140, filed on Mar. 9, 2007, entitled "THREE-LAYERED OPTICAL PLATE AND BACKLIGHT MODULE WITH SAME", application Ser. No. 11/716,141, filed on Mar. 9, 2007, entitled "OPTICAL PLATE HAVING THREE LAYERS AND BACKLIGHT MODULE WITH SAME", application Ser. No. 11/716,143, filed on Mar. 9, 2007, entitled "OPTICAL PLATE HAVING THREE LAYERS AND BACKLIGHT MODULE WITH SAME", application Ser. No. 11/716,158, filed on Mar. 9, 2007, entitled "OPTICAL PLATE HAVING THREE LAYERS AND BACKLIGHT MODULE WITH SAME", application Ser. No. 11/716,323, filed on Mar. 9, 2007, entitled "OPTICAL PLATE HAVING THREE LAYERS AND BACKLIGHT MODULE WITH SAME", application Ser. No. 11/784,354, filed on Apr. 6, 2007, entitled "OPTICAL PLATE HAVING THREE LAYERS AND BACKLIGHT MODULE WITH SAME", application Ser. No. 11/784,355, filed on Apr. 6, 2007, entitled "OPTICAL PLATE HAVING THREE LAYERS AND BACKLIGHT MODULE WITH SAME", application Ser. No. 11/784,419, filed on Apr. 6, 2007, entitled "OPTICAL PLATE HAVING THREE LAYERS AND BACKLIGHT MODULE WITH SAME", application Ser. No. 11/784,425, filed on Apr. 6, 2007, entitled "OPTICAL PLATE HAVING THREE LAYERS AND BACKLIGHT MODULE WITH SAME", application Ser. No. 11/784,426, filed on Apr. 6, 2007, entitled "OPTICAL PLATE HAVING THREE LAYERS AND BACKLIGHT MODULE WITH SAME", application Ser. No. 11/786,913, filed on Apr. 13, 2007, entitled "OPTICAL PLATE HAVING THREE LAYERS AND BACKLIGHT MODULE WITH SAME", application Ser. No. 11/786,914, filed on Apr. 13, 2007, entitled "OPTICAL PLATE HAVING THREE LAYERS AND BACKLIGHT MODULE WITH SAME", application Ser. No. 11/786,991, filed on Apr. 13, 2007, entitled "OPTICAL PLATE HAVING THREE LAYERS AND BACKLIGHT MODULE WITH SAME", application Ser. No. 11/787,069, filed on Apr. 13, 2007, entitled "OPTICAL PLATE HAVING THREE LAYERS AND BACKLIGHT MODULE WITH SAME". All of such applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically employed in a liquid crystal display (LCD).

2. Discussion of the Related Art

A weight and/or a thickness of LCD panels makes them suitable for use in a wide variety of electronic devices such as personal digital assistants (PDAs), mobile phones, portable personal computers, and other electronic appliances. Liquid crystal is a substance that does not emit light. Instead, the liquid crystal relies on receiving light from a light source in order to display data images. In the case of a typical LCD panel, a backlight module powered by electricity supplies the needed light.

FIG. 11 is an exploded, side cross-sectional view of a typical direct type backlight module 10 employing a typical optical diffusion plate. The backlight module 10 includes a housing 11, a plurality of lamps 12 disposed above a base of the housing 11 for emitting light, and a light diffusion plate 13 and a prism sheet 14 stacked on a top of the housing 11 in that order. The housing 11 is configured for reflecting light towards the diffusion plate 13. The light diffusion plate 13 includes a plurality of dispersion particles. The dispersion particles are configured for scattering light, thereby enhancing a uniformity of light output from the light diffusion plate 13. A top of the prism sheet 14 includes a plurality of V-shaped structures. The V-shaped structures are configured for collimating received light to a certain extent.

In use, light from the lamps 12 enters the prism sheet 14 after being scattered in the light diffusion plate 13. The light is refracted in the prism sheet 14 and are concentrated by the V-shaped structures so as to increase a brightness of light illumination, and finally propagate into an LCD panel (not shown) disposed above the prism sheet 14. The brightness may be improved by the V-shaped structures, but the viewing angle may be narrowed. In addition, even though the light diffusion plate 13 and the prism sheet 14 abut each other, a plurality of air pockets still exists at the boundary between them. When the backlight module 10 is in use, light passes through the air pockets, and some of the light undergoes total reflection at one or another of the interfaces at the air pockets. As a result, the light energy utilization ratio of the backlight module 10 is reduced.

Therefore, a new optical means is desired in order to overcome the above-described shortcomings.

SUMMARY

In one aspect, an optical plate includes a first transparent layer, a second transparent layer and a light diffusion layer. The light diffusion layer is between the first and second transparent layers. The light diffusion layer includes a transparent matrix resin and a plurality of diffusion particles dispersed in the transparent matrix resin. The first transparent layer, the light diffusion layer, and the second transparent layer are integrally formed, with the first transparent layer in immediate contact with the light diffusion layer, and the second transparent layer in immediate contact with the light diffusion layer. Both the first and second transparent layers form a plurality of spherical protrusions protruding from an outer surface that is distalmost from the light diffusion layer respectively.

In another aspect, a method for making an optical plate includes the following steps: heating a first transparent matrix resin to a melted state; heating a second transparent matrix resin mixed with diffusion particles to a melted state; heating a third transparent matrix resin to a melted state; injecting the melted first transparent matrix resin into a first molding chamber of a multi-shot injection mold to form a first transparent layer of the at least one optical plate, the multi-shot injection mold including a first mold and at least one second mold, the first mold defining at least one molding cavity receiving the at least one second mold, the first mold including a plurality of first spherical depressions formed at an inmost end of the at least one molding cavity, the second mold including a plurality of second spherical depressions formed at the molding surface, a portion of the at least one molding cavity and the at least one second mold cooperatively forming the first molding chamber; moving the at least one second mold a distance away from the inmost end of the at least one molding cavity of the first mold; injecting the melted second transparent matrix resin mixed with diffusion particles into the second molding chamber of the multi-shot injection mold to form a light diffusion layer of the at least one optical plate on the first transparent layer, a portion of the at least one molding cavity, the first transparent layer, and the at least one second mold cooperatively forming the second molding chamber; moving the at least one second mold a further distance away from the inmost end of the at least one molding cavity of the first mold; injecting the melted third transparent matrix resin into the third molding chamber of the multi-shot injection mold to form a second transparent layer of the at least one optical plate on the light diffusion layer, a portion of the at least one molding cavity, the transparent layer, and the at least one second mold cooperatively forming the second molding chamber; taking the combined first transparent layer, light diffusion layer and second transparent layer out of the at least one molding cavity of the first mold.

In still another aspect, another method for making an optical plate includes the following steps: heating a first transparent matrix resin to a melted state; heating a second transparent matrix resin mixed with diffusion particles to a melted state; heating a third transparent matrix resin to a melted state; injecting the melted first transparent matrix resin into a first molding chamber of a multi-shot injection mold to form a first transparent layer of the at least one optical plate, the multi-shot injection mold including a first mold, a second mold and a third mold, the first mold defining at least one molding cavity receiving the second mold and the third mold, the first mold including a plurality of spherical depressions formed at an inmost end of the at least one molding cavity, the second mold including a plurality of spherical depressions formed at the molding surface, a portion of the at least one molding cavity and one mold selecting from the second mold and the third mold cooperatively forming the first molding chamber; moving a mold selected from the second mold and the third mold a distance away from the inmost end of the at least one molding cavity of the first mold; injecting the melted second transparent matrix resin mixed with diffusion particles into the second molding chamber of the multi-shot injection mold to form a light diffusion layer of the at least one optical plate on the first transparent layer, a portion of the at least one molding cavity, the first transparent layer, and the third mold cooperatively forming the second molding chamber; moving the other mold after selecting from the second mold and third mold a further distance away from the inmost end of the at least one molding cavity of the first mold; injecting the melted third transparent matrix resin into the third molding chamber of the multi-shot injection mold to form a second transparent layer of the at least one optical plate on the light diffusion layer, a portion of the at least one molding cavity, the transparent layer, and the second mold cooperatively forming the second molding chamber; taking the combined first transparent layer, light diffusion layer and second transparent layer out of the at least one molding cavity of the first mold.

Other novel features and advantages will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE EMBODIMENTS

Reference will now be made to the drawings to describe embodiments of the present optical plate and methods of making the same, in detail.

Figure 1:
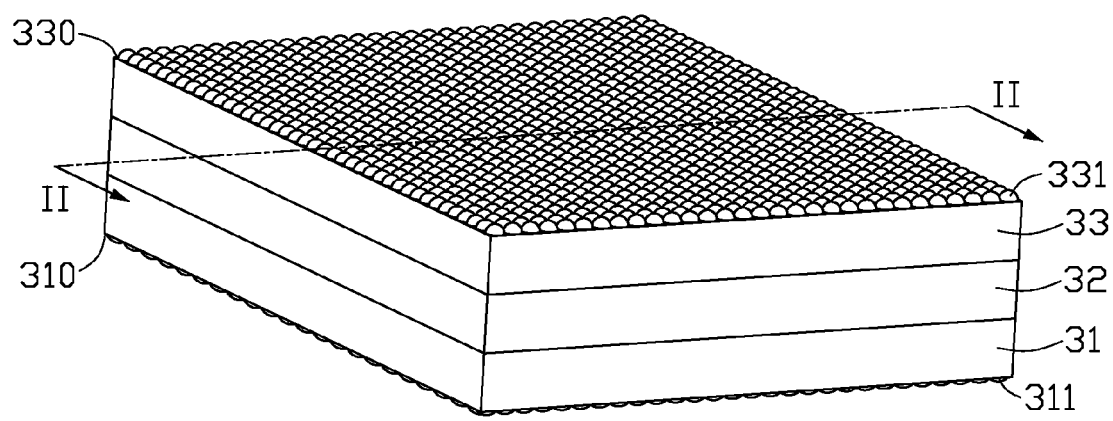
FIG. 1 is an isometric view of an optical plate in accordance with a first embodiment of the present invention.
Figure 2:
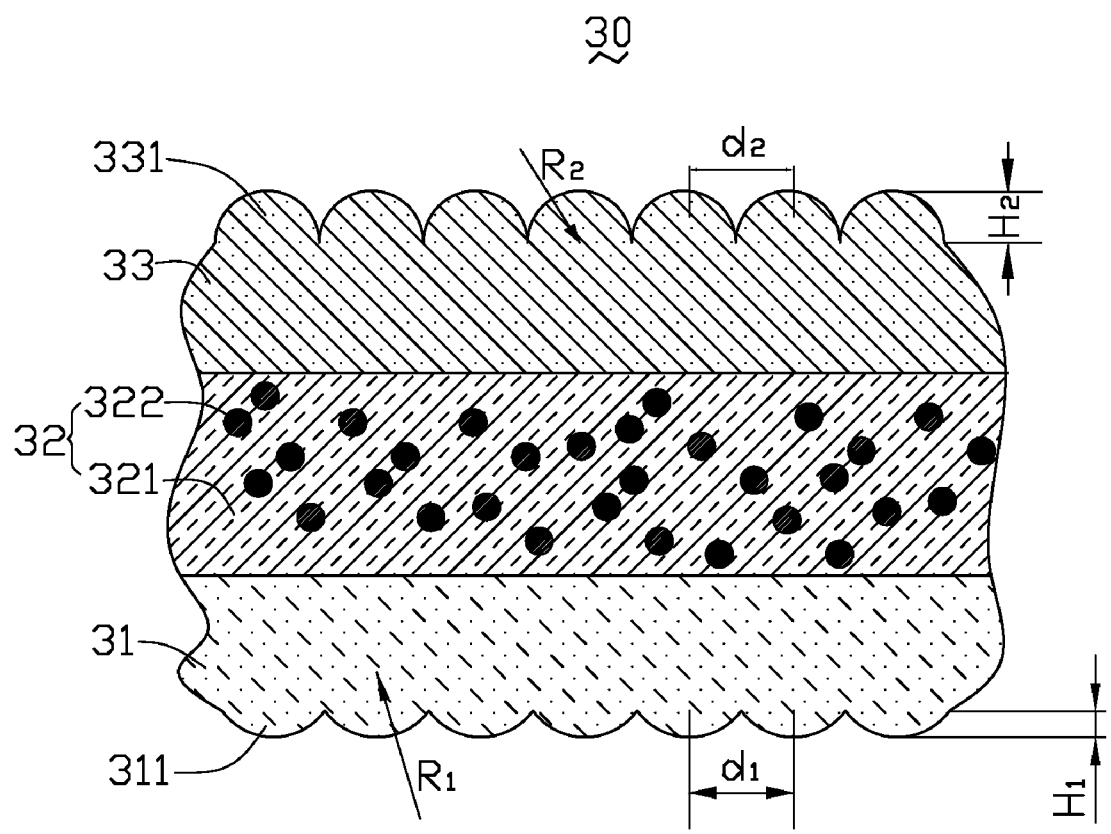
FIG. 2 is a abbreviated side cross-sectional view of the optical plate of FIG. 1, taken along line II-II thereof.

Referring to FIGS. 1 and 2, an optical plate 30 according to a first embodiment of the present invention is shown. The optical plate 30 includes a first transparent layer 31, a light diffusion layer 32, and a second transparent layer 33. The first transparent layer 31, the light diffusion layer 32, and the second transparent layer 33 are integrally formed with the light diffusion layer 32 between the first and second transparent layers 31, 33. The first transparent layer 31 and the light diffusion layer 32 are in immediate contact with each other at a first common interface. Similarly, the second transparent layer 33 and the light diffusion layer 32 are in immediate contact with each other at a second common interface. A unified body with no gaps at the common interfaces can be made by multi-shot injection molding technology. The first transparent layer 31 defines a plurality of first spherical protrusions 311 protruding from an outer surface 310 that is distalmost from the light diffusion layer 32. The second transparent layer 33 also defines a plurality of second spherical protrusions 331 protruding from an outer surface 330 that is distalmost from the light diffusion layer 32.

A thickness of each of the first transparent layer 31, the light diffusion layer 32, and the second transparent layer 33 may be larger than or equal to 0.35 millimeters. In a preferred embodiment, a combined thickness of the first transparent layer 31, the light diffusion layer 32, and the second transparent layer 33 may be about 1.05 millimeters to about 6 millimeters.

The first transparent layer 31 can be made of one or more transparent matrix resin selected from a group consisting of polyacrylic acid (PAA), polycarbonate (PC), polystyrene (PS), polymethyl methacrylate (PMMA), methylmethacrylate and styrene copolymer (MS), and any suitable combination thereof. The first spherical protrusions 311 are arranged on the light outer surface 310 of the first transparent layer 31 in a first matrix manner. In order to obtain good optical effects, a radius $R_1$ of each first spherical protrusion 311 is preferably in the range from about 0.01 millimeters (mm) to about 3 mm. A height $H_1$ of each first spherical protrusion 311 is in the range from about 0.01 mm to the radius $R_1$. A pitch $d_1$ between two adjacent first spherical protrusions 311 is in the range from about half of the radius $R_1$ to about four times of the radius $R_1$. If the radius value $R_1$ of the first spherical protrusion 311 is set to a constant, the first spherical protrusions 311 may obtain different shapes and be arranged in different manners by changing the height $H_1$ and the pitch $d_1$ of the first spherical protrusions 311.

In this embodiment, the pitch $d_1=2R_1$, and the height $H_1=R_1/2$, thus each first spherical protrusion 311 is a dome and the first spherical protrusions 311 are arranged in the first continued matrix manner such that the spherical protrusions in adjacent rows abut each other correspondingly. When the pitch $d_1=2R_1$, and the height $H_1=R_1$, each first spherical protrusion 311 is a hemisphere and the first spherical protrusions 311 are arranged in the first continued matrix manner. When the pitch $d_1=4R_1$, and the height $H_1=R_1$, each first spherical protrusion 311 is a hemisphere and the first spherical protrusions 311 are arranged in the first distant matrix manner such that the spherical protrusions in adjacent rows are spaced apart correspondingly.

The light diffusion layer 32 includes a transparent matrix resin 321, and a plurality of diffusion particles 322 uniformly dispersed in the transparent matrix resin 321. The light diffusion layer 32 is configured for enhancing optical uniformity. The transparent layer 321 is made of one or more transparent matrix resin selected from a group including polyacrylic acid (PAA), polycarbonate (PC), polystyrene (PS), polymethyl methacrylate (PMMA), methylmethacrylate and styrene copolymer (MS), and any suitable combination thereof. The diffusion particles 322 can be made of material selected from a group consisting of titanium dioxide, silicon dioxide, acrylic resin, and any combination thereof. The diffusion particles 322 are configured for scattering light and enhancing the uniformity of light exiting the light diffusion layer 32. The light diffusion layer 32 preferably has a light transmission ratio in the range from 30% to 98%. The light transmission ratio of the light diffusion layer 32 is determined by a composition of the transparent matrix resin 321 and the diffusion particles 322.

The second transparent layer 33 can be made of one or more transparent matrix resin selected from a group consisting of polyacrylic acid (PAA), polycarbonate (PC), polystyrene (PS), polymethyl methacrylate (PMMA), methylmethacrylate and styrene copolymer (MS), and any suitable combination thereof. The second spherical protrusions 331 are arranged on the outer surface 330 of the second transparent layer 33 in a second matrix manner. A radius $R_2$, a height $H_2$, and a pitch $d_2$ of each second spherical protrusion 331 have the same range as the first spherical protrusion 311 arranged on the outer surface 310 of the first transparent layer 31. In this embodiment, the pitch $d_2=2R_2$, and the height $H_2=R_2$, so each second spherical protrusion 331 is a hemisphere and the second spherical protrusions 331 are arranged in the second continuous matrix manner such that the spherical protrusions in adjacent rows abut each other correspondingly.

The first spherical protrusions 311 and the second spherical protrusions 331 can diffuse light that enters the optical plate 30 through the first transparent layer 31 or the second transparent layer 33. The spherical protrusions 311, 331 can also concentrate light that comes out from the optical plate 30. The backlight module using the optical plate 30 can have different visual angle and brightness via a change of shape, size, and manner of the spherical protrusions 311, 331.

In alternative embodiments, the spherical protrusions 311, 331 are not limited to being arranged regularly in the matrix manners described. The spherical protrusions 311, 331 can instead be arranged in other manners described. For example, the spherical protrusions 311 can have some offset relative to the spherical protrusions 311 of the adjacent rows correspondingly. In another example, the spherical protrusions 311 can be arranged in a random manner on the light output surface 310. Further, the spherical protrusions 311, 331 may be of different sizes and shapes. For example, a radius of each spherical protrusion 331 of a predetermined group of the spherical protrusions can be greater than the radius of each of the other spherical protrusions 331.

Figure 3:
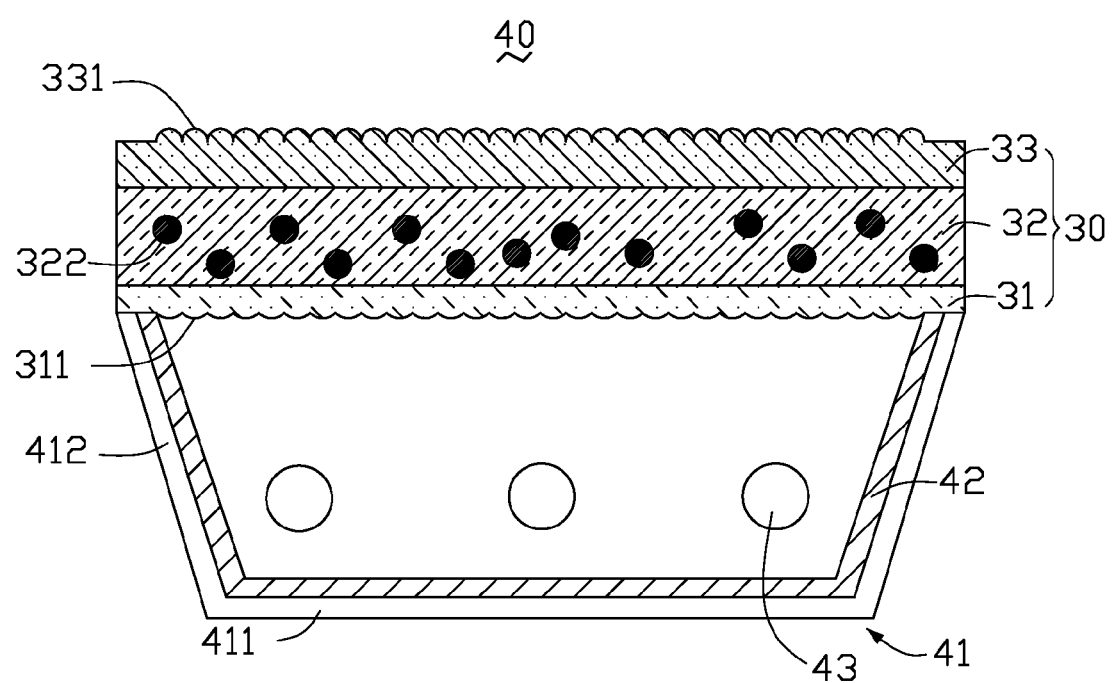
FIG. 3 is a abbreviated side cross-sectional view of a direct type backlight module in accordance with a second embodiment of the present invention, the backlight module including the optical plate shown in FIG. 1.

Referring to FIG. 3, a direct type backlight module 40 according to a second embodiment of the present invention is shown. The backlight module 40 includes a housing 41, a reflective plate 42, a plurality of lamp tubes 43, and the optical plate 30. The housing 41 includes a base 411 and a plurality of sidewalls 412 extending from a peripheral of the base 411. An inner surface of the base 411 and the sidewalls 412 is covered with the reflective plate 42. The lamp tubes 43 are arranged in parallel above the base 411 of the housing 41. The optical plate 30 is positioned on top of the housing 31 with the first transparent layer 31 facing the lamp tubes 43.

In the backlight module 40, when light enters the optical plate 30 via the first transparent layer 31, the light is diffused by the first spherical protrusions 311. Then the light is further substantially diffused by the light diffusion layer 32 of the optical plate 30. Finally, most of the light is concentrated by the second spherical protrusions 331 before exiting the optical plate 30. Therefore, a brightness of the backlight module 40 is increased. In addition, because the light is diffused twice, an optical uniformity of the optical plate 30 is enhanced. Furthermore, the first transparent layer 31, the light diffusion layer 32, and the second transparent layer 33 are integrally formed together (see above), with no air or gas pockets at the interfaces. Thus a light utilization efficiency is increased. Moreover, when the optical plate 30 is employed in the backlight module 40, the optical plate 30 in effect replaces a conventional combination of a diffusion plate and a prism sheet. Thus, an assembly process of the backlight module 40 is simplified, and an assembly process efficiency is improved. Still further, in general, a volume occupied by the optical plate 30 is less than that occupied by the conventional combination of a diffusion plate and a prism sheet. Thus, a size of the backlight module 40 is reduced.

In the alternative embodiment, the optical plate 30 is positioned on top of the housing 31, with the second transparent layer 32 facing the lamp tubes 43. In that way, the light is diffused by the second spherical protrusions 331 and light diffusion layer 32 in turn, and finally concentrated by the first spherical protrusions 311 before exiting the optical plate 30.

Figure 5:
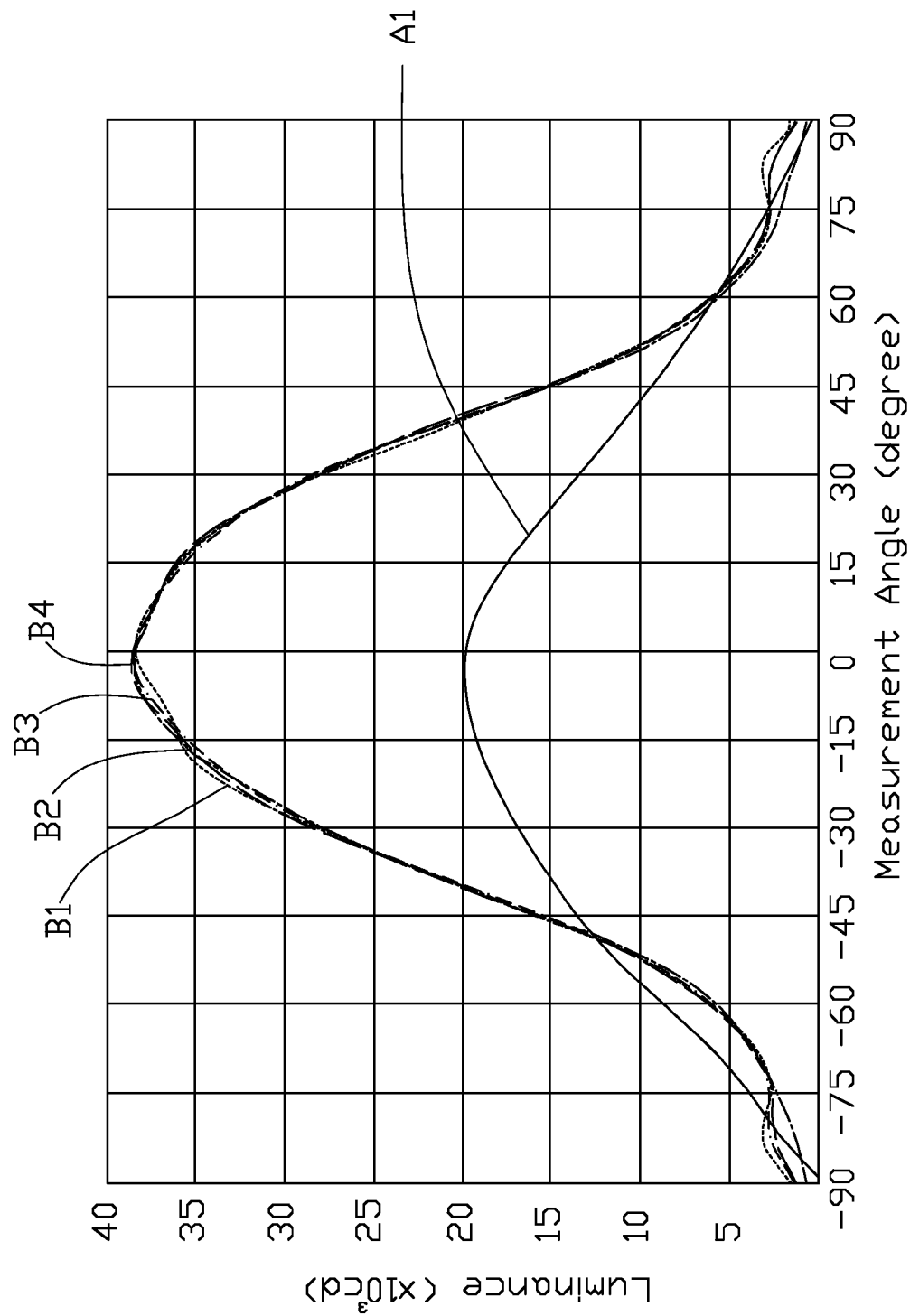
FIG. 5 is a graph of luminance varying according to viewing angle in respect of a backlight module using conventional light diffusion plate, and another backlight module having an optical plate in accordance with the first embodiment of the present invention.

In order to test optical characteristics of the optical plate 30, two backlight modules are provided and tested; one with a conventional prism sheet and another one with the optical plate 30. Results of the tests are illustrated in FIG. 5. In the test, a housing 41 and a plurality of lamp tubes 43 were provided to test the two backlight modules.

Figure 4:
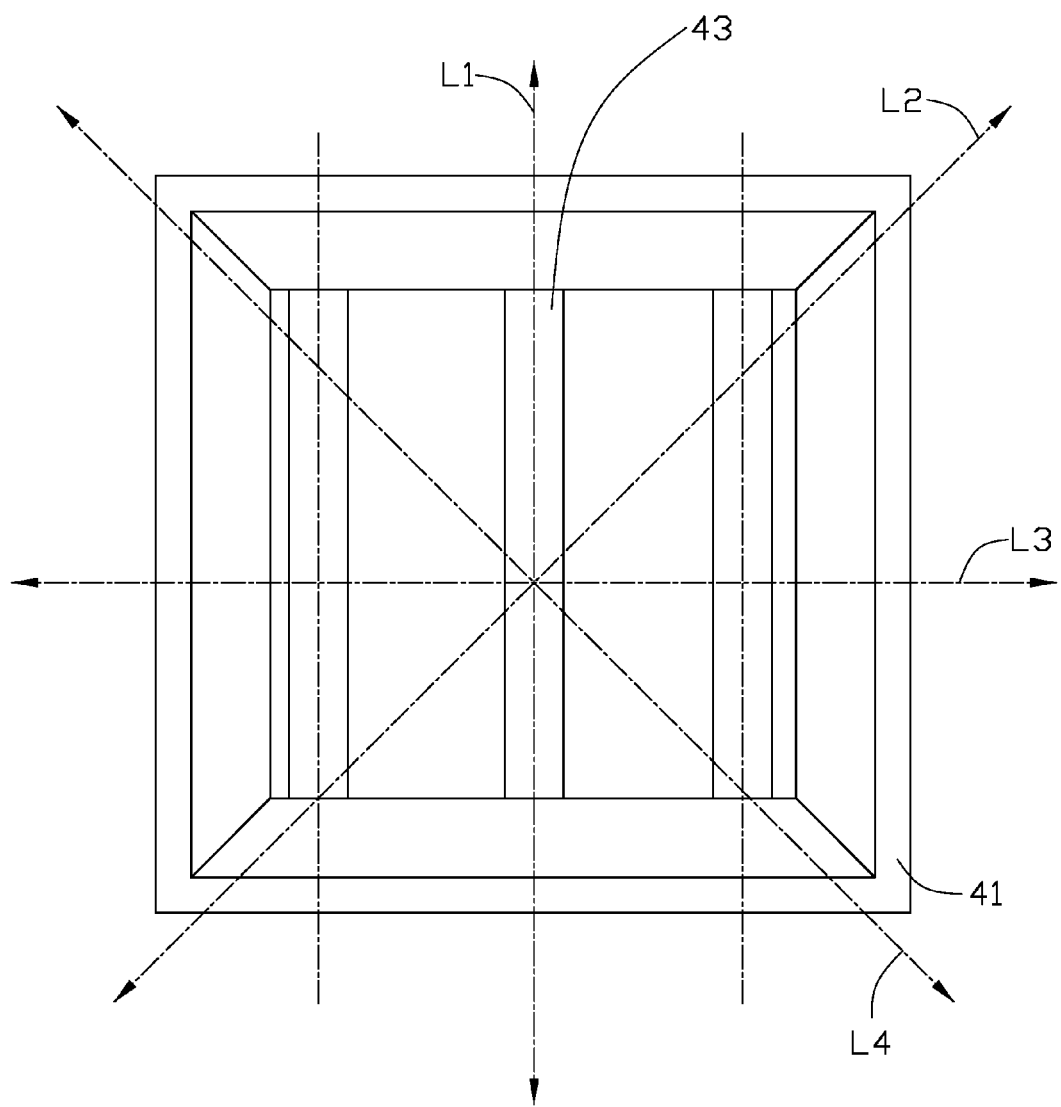
FIG. 4 is a top plan view of a direct type backlight module removed the optical plate in accordance with a second embodiment of the present invention.

Referring to FIG. 4, during the tests, four ranges of viewing angles are defined. Each range of viewing angles is from −90° to 90° (a total span of 180°), measured on the planes that is perpendicular to the conventional prism sheet or the optical plate 30 and passes through the center of the conventional prism sheet or the optical plate 30. A first range of viewing angles occupies a plane L1 that coincides with axes of each lamp tube 43. A second range of viewing angles occupies a plane L2 that is oriented 45° away from the first range of viewing angles in a first direction. A third range of viewing angles occupies a plane L3 that is perpendicular to the axes of each lamp tube 43. A fourth range of viewing angles occupies a plane L4 that is oriented 135° away from the first range of viewing angles in the first direction.

Curve A1 represent viewing angle characteristics tested about the backlight using the conventional prism along the first ranges of viewing angles as defined above. Curves B1, B2, B3, and B4 represent viewing angle characteristics tested about the backlight module using the optical plate 30 along the four ranges of viewing angles as defined above. It can be seen that the optical plate 30 greatly improves the brightness of the backlight module when the range of viewing angles is from −45° to 45°. In addition, the Curves B1, B2, B3, and B4 nearly overlap, so the backlight module using the optical plate 30 can have better optical uniformity.

Figure 6:
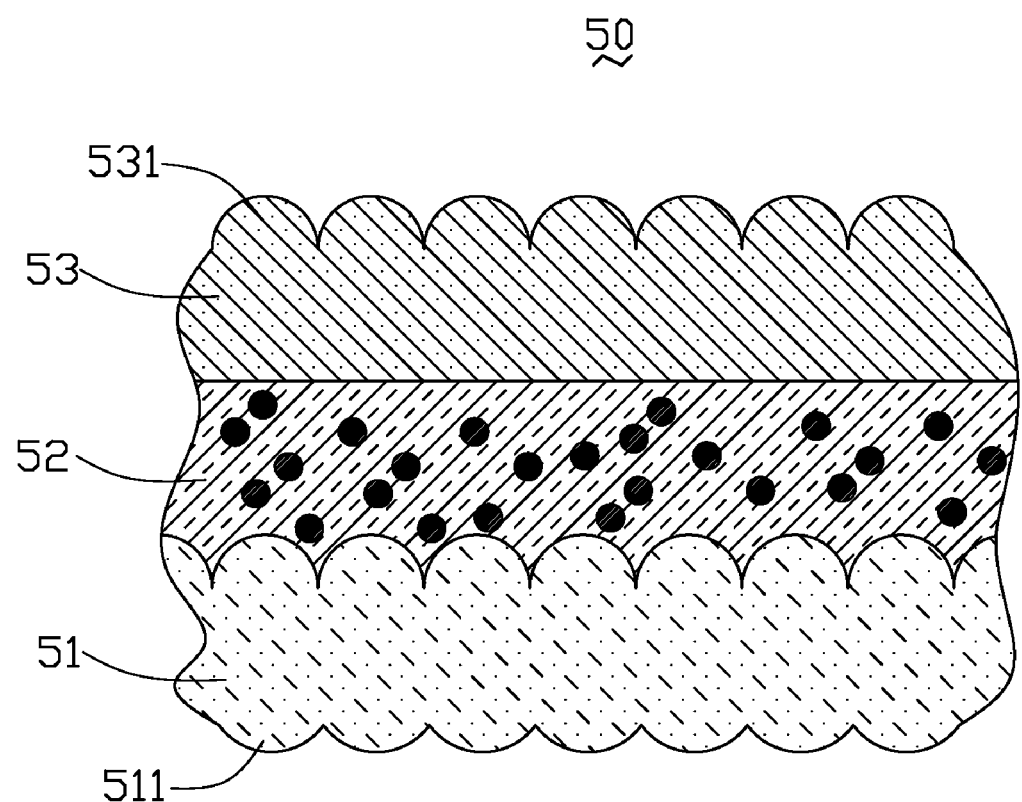
FIG. 6 is a side cross-sectional plan view of an optical plate in accordance with a third embodiment of the present invention.

Referring to FIG. 6, an optical plate 50 according to a third embodiment of the present invention is shown. The optical plate 50 is similar in principle to the optical plate 30 of the first embodiment. The optical plate 50 also includes a first transparent layer 51, a light diffusion layer 52, and a second transparent layer 53. However, a first common interface (not labeled) between the first transparent layer 51 and the light diffusion layer 52 is non-planar. Examples of such non-planar interface include curved interface such as a wavy interface. Therefore, a binding strength between the first transparent layer 51 and the light diffusion layer 52 is increased. Similarly, a second common interface between the light diffusion layer 52 and the second transparent layer 53 can also be a non-planar interface.

An exemplary method for making the optical plate 50 will now be described. The optical plate 50 is made using a multi-shot injection molding technique.

Figure 7:
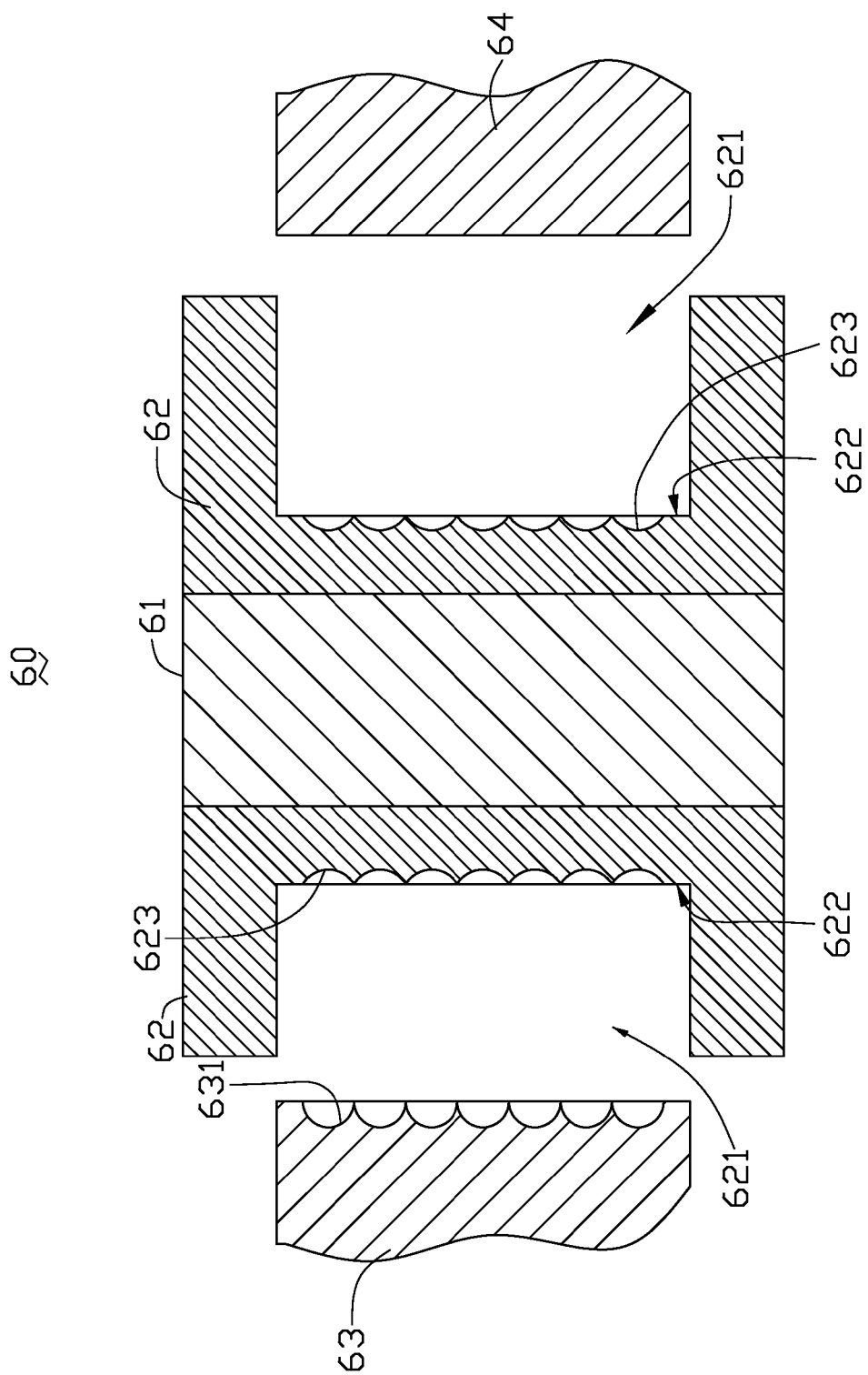
FIG. 7 is a side cross-sectional view of a multi-shot injection mold used in an exemplary method for making the optical plate of FIG. 6.

Referring to FIG. 7, a multi-shot injection mold 60 is provided for making the optical plate 30. The multi-shot injection mold 60 includes a rotating device 61, a first mold 62 functioning as two female molds, a second mold 63 functioning as a first male mold, and a third mold 64 functioning as a second male mold. The first mold 62 defines two molding cavities 621, and includes an inmost surface 622 at an inmost end of each of the molding cavities 621. A plurality of spherical depressions 623 is formed at each of the inmost surfaces 622. Each of the spherical depressions 623 has a shape corresponding to that of each of the spherical protrusions 511 of the first transparent layers 51. The molding surface of the second mold 63 also has a plurality of spherical depressions 631. Each of the spherical depressions 631 has a shape corresponding to that of each of the spherical protrusions 531 of the second transparent layers 53. Furthermore, the sprue of the multi-shot injection mold 60 can set in the first mold 62 or at the brim of the second mold 63 and the third mold 64.

Figure 8:
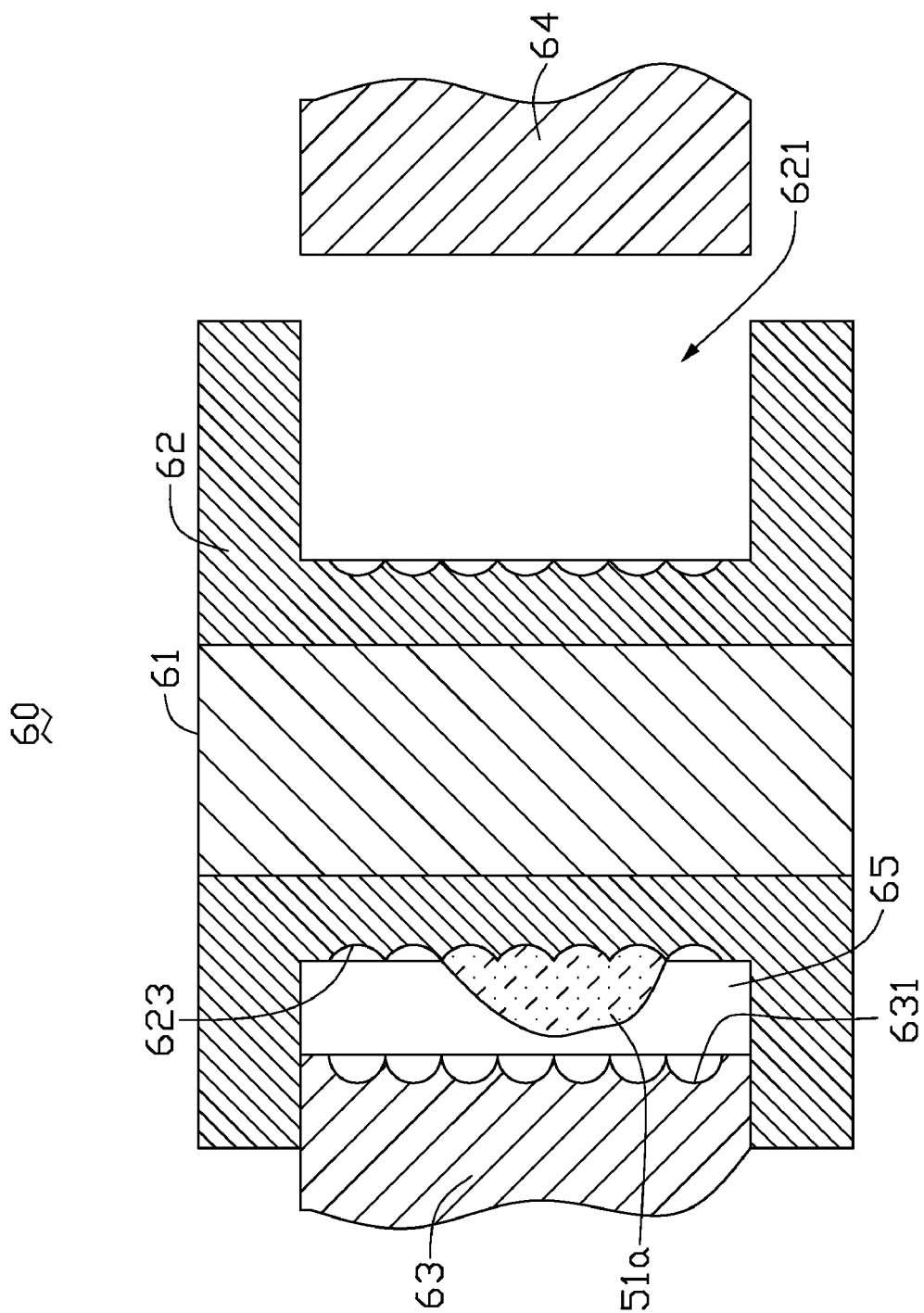
FIG. 8 is a side cross-sectional view of a multi-shot injection mold used in an exemplary method for making the optical plate of FIG. 6, showing formation of a first transparent layer of the optical plate.
Figure 9:
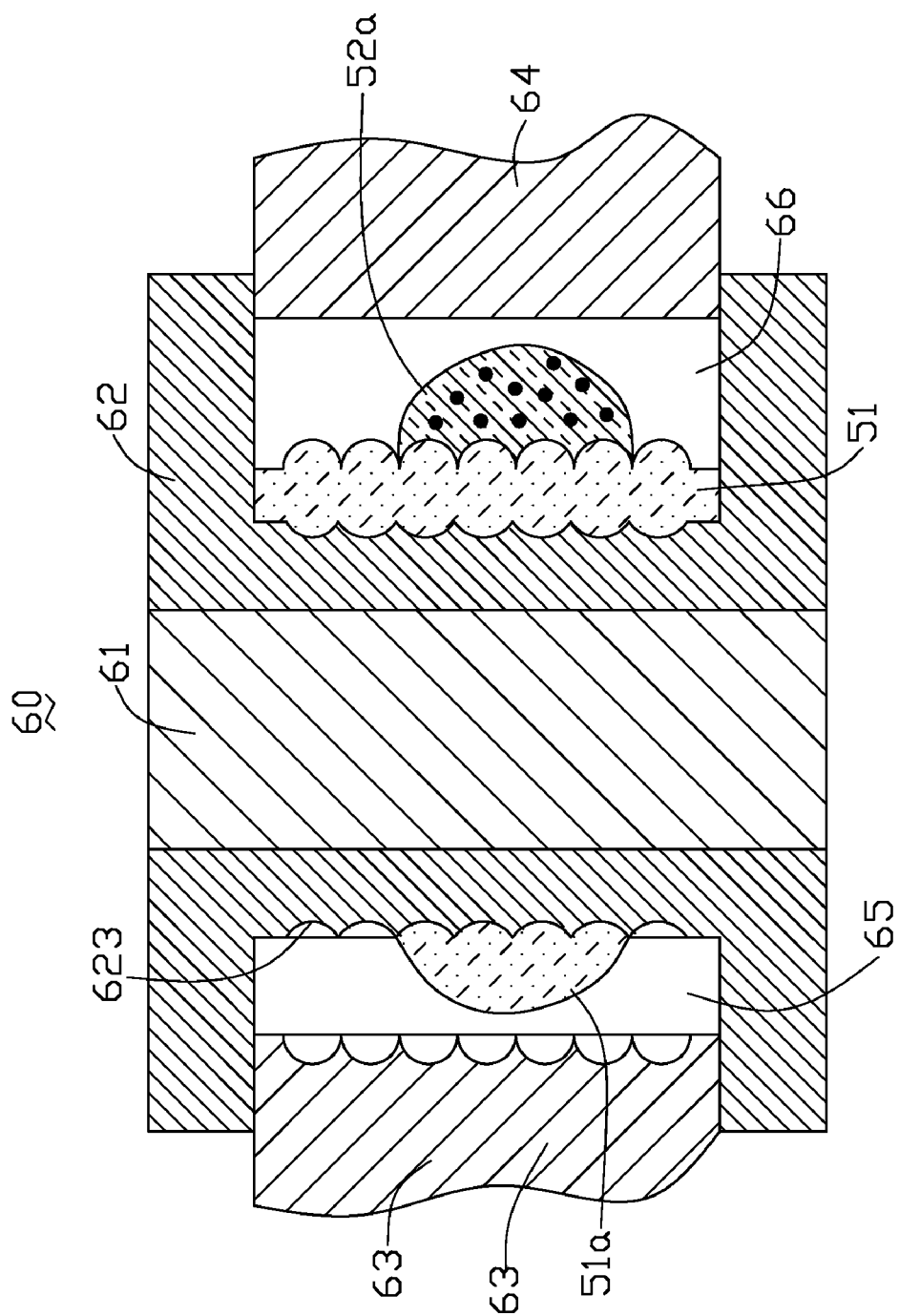
FIG. 9 is similar to FIG. 8, but showing subsequent formation of a light diffusion layer of the optical plate on the first transparent layer, and showing simultaneous formation of a first transparent layer of a second optical plate.
Figure 10:
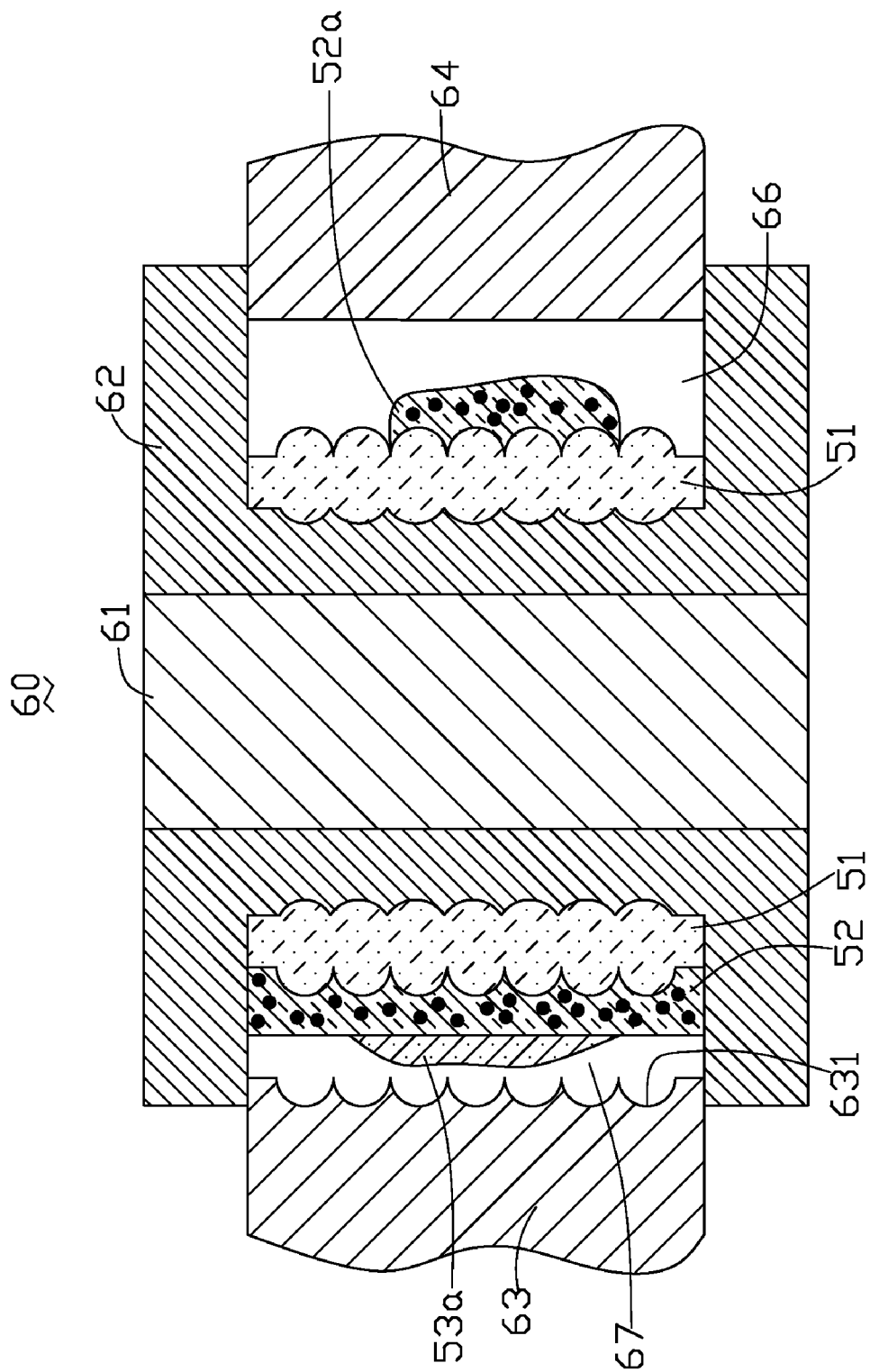
FIG. 10 is similar to FIG. 8, but showing subsequent formation of a second transparent layer of the optical plate on the light diffusion layer, and showing simultaneous formation of a light diffusion layer of a second optical plate on the first transparent layer.
Figure 11:
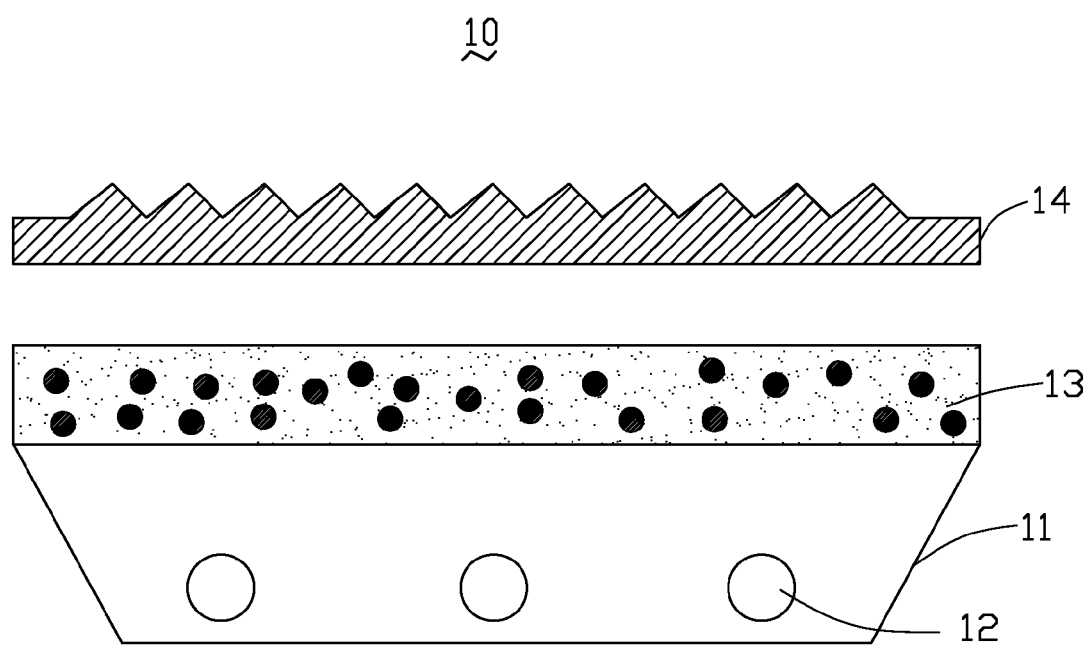
FIG. 11 is an exploded, side cross-sectional view of a conventional backlight module.

Referring to FIGS. 8, 9 and 10, in a molding process, a first transparent matrix resin 51a is melted. The first transparent matrix resin 51a is for making the transparent layer 51. A first one of the molding cavities 621 of the first mold 62 slidably receives the second mold 63, so as to form a first molding chamber 65 for molding the first transparent matrix resin 51a. Then, the melted first transparent matrix resin 51a is injected into the first molding chamber 65. After the first transparent layer 51 is formed, the second mold 63 is withdrawn from the first molding cavity 621. The first mold 62 is rotated about 180° in a first direction. A second transparent matrix resin 52a mixed with diffusion particles is melted. The second transparent matrix resin 52a mixed with diffusion particles is for making the light diffusion layer 52. The first molding cavity 621 of the first mold 62 slidably receives the third mold 64, so as to form a second molding chamber 66 for molding the second transparent matrix resin 52a mixed with diffusion particles. Then, the melted second transparent matrix resin 52a is injected into the second molding chamber 66. After the light diffusion layer 52 is formed, the third mold 64 is withdrawn from the first molding cavity 621. The first mold 62 is rotated about 180° further in the first direction. A third transparent matrix resin 53a is melted. The third transparent matrix resin 53a is for making the second transparent layer 53. The first molding cavity 621 of the first mold 62 slidably receives the second mold 63 again, so as to form a third molding chamber 67 for molding the second transparent matrix resin 53a. Then, the melted third transparent matrix resin 53a is injected into the third molding chamber 67. After the second transparent layer 53 is formed, the second mold 63 is withdrawn from the first molding cavity 621. The first mold 62 is rotated further in the first direction, for example about 90 degrees, and the solidified combination of the first transparent layer 51, the light diffusion layer 52 and the second transparent layer 53 is removed from the first molding cavity 621. In this way, the optical plate 50 is formed using the multi-shot injection mold 60.

The first transparent layer 51, the light diffusion layer 52 and the second transparent layer 53 of each optical plate 50 are integrally formed by the multi-shot injection mold 60. Therefore no air or gas is trapped among the three layers 51, 52, 53. Thus the two interfaces among the three layers 51, 52, 53 provides for maximum unimpeded passage of light therethrough.

In order to manufacture the optical plate with great efficiency, the two molding cavities 621 of the first mold 62 can be used at the same time. For instance, when the first molding cavity 621 slidably receives the third mold 64 to form the second molding chamber 66 for molding the light diffusion layer 52 of a first optical plate 50, simultaneously, the second molding cavity 621 can slidably receives the second mold 63 to form the first molding chamber 65 for molding the first transparent layer 51 of a second optical plate 50. When the first molding cavity 621 slidably receives the second mold 63 to form the third molding chamber 67 for molding the second transparent layer 53 of a first optical plate 50, simultaneously, the second molding cavities 621 can slidably receives the third mold 64 to form the second molding chamber 66 for molding the diffusion layer 52 of a second optical plate 50.

The multi-shot injection mold 60 also can be used to make other optical plate of different structure, for example, the optical plate 30 described in the first embodiment. Firstly, the first molding cavity 621 of the first mold 62 receives the third mold 64, so as to form a first molding chamber. Then, the melted first transparent matrix resin 51a is injected into the chamber to form the first transparent layer 31. After the first transparent layer 31 is formed, the third mold 64 move backward a certain distance relative to the inmost surfaces 622 of first molding cavity 621 to form a second molding chamber. Then, second transparent matrix resin 52a mixed with diffusion particles is injected into the chamber to form the light diffusion layer 32. After the light diffusion layer 32 is formed, the third mold 64 is withdrawn from the first molding cavity 621. The first mold 62 is rotated about 180° in a first direction. The first molding cavity 621 of the first mold 62 slidably receives the second mold 63, so as to form a third molding chamber for molding the second transparent layer 33. Lastly, the second mold 63 is withdrawn from the first molding cavity 621 and the optical plate 30 is removed from the first molding cavity 621.

In alternative embodiment, a plurality of spherical depressions can also be formed at the molding surface of the third mold 64. As a result, both the interface between the first transparent layer 51 and the light diffusion layer 52 and the interface between the second transparent layer 53 and the light diffusion layer 52 of the optical plate made by the multi-shot injection mold are non-planar interface.

Alternatively, the first optical plate 50 can be formed using only one female mold, such as that of the first mold 62 at the first molding cavity 621 or the second molding cavity 621, and one male mold, such as the second mold 63 or the third mold 64. For example, a female mold such as that of the first molding cavity 621 can be used with a male mold such as the second mold 63. In this kind of embodiment, the first transparent layer 51 is first formed in a first molding chamber cooperatively formed by the male mold moved to a first position and the female mold. Then the male mold is separated from the transparent layer 51 and moved a short distance to a second position. Thus a second molding chamber is cooperatively formed by the male mold, the female mold, and the transparent layer 51. At that time, the light diffusion layer 52 is formed on the transparent layer 51 in the second molding chamber. Then the male mold is separated from the light diffusion layer 51 and moved a short distance to a third position. Thereby a third molding chamber is cooperatively formed by the male mold, the female mold, and the light diffusion layer 52. Then the second transparent layer is formed on the light diffusion layer 52 in the third molding chamber.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for making at least one optical plate, comprising:

heating a first transparent matrix resin to a melted state;

heating a second transparent matrix resin mixed with diffusion particles to a melted state;

heating a third transparent matrix resin to a melted state;

injecting the melted first transparent matrix resin into a first molding chamber of a multi-shot injection mold to form a first transparent layer of the at least one optical plate, the multi-shot injection mold including a first mold and at least one second mold, the first mold defining at least one molding cavity receiving the at least one second mold, the first mold including a plurality of first spherical depressions formed at an inmost end of the at least one molding cavity, the second mold including a plurality of second spherical depressions formed at the molding surface, a portion of the at least one molding cavity and the at least one second mold cooperatively forming the first molding chamber;

moving the at least one second mold a distance away from the inmost end of the at least one molding cavity of the first mold;

injecting the melted second transparent matrix resin mixed with diffusion particles into a second molding chamber of the multi-shot injection mold to form a light diffusion layer of the at least one optical plate on the first transparent layer, a portion of the at least one molding cavity, the first transparent layer, and the at least one second mold cooperatively forming the second molding chamber;

moving the at least one second mold a further distance away from the inmost end of the at least one molding cavity of the first mold;

injecting the melted third transparent matrix resin into a third molding chamber of the multi-shot injection mold to form a second transparent layer of the at least one optical plate on the light diffusion layer, a portion of the at least one molding cavity, the first transparent layer, the light diffusion layer, and the at least one second mold cooperatively forming the third molding chamber;

taking the combined first transparent layer, light diffusion layer and second transparent layer out of the at least one molding cavity of the first mold, wherein a thickness of each of the first transparent layer, the light diffusion layer, and the second transparent layer is greater than or equal to 0.35 millimeters.

2. The method for making at least one optical plate as claimed in claim 1, wherein the multi-shot injection mold further comprises a rotating device, the at least one second mold is two second molds, the at least one molding cavity is two molding cavities, a first one of the molding cavities receives a first one of the second molds to define the first molding chamber, and after the melted first transparent matrix resin is injected into the first molding chamber to form a first transparent layer, the first one of the second mold is withdrawn from the first molding cavity of the first mold, and the first mold is rotated, and after the first mold is rotated, the first molding cavity receives the second one of the second mold to define the second molding chamber, and after the melted second transparent matrix resin mixed with diffusion particles is injected into the second molding chamber to form a light diffusion layer, the second one of the second mold is withdrawn from the first molding cavity of the first mold, and the first mold is rotated, and after the first mold is rotated, the first molding cavity receives the first one of the second mold again to define the third molding chamber to form a second transparent layer; during above molding process, the second molding cavity of the first mold also receives the two second mold in turn to form the first transparent layer, light diffusion layer, second transparent layer of another optical plate.

3. The method for making at least one optical plate as claimed in claim 1, wherein the diffusion particles are made of one or more materials selected from the group consisting of titanium dioxide, silicon dioxide, acrylic resin, and any combination thereof.

* * * * *